United States Patent
Allen et al.

(10) Patent No.: US 10,364,684 B2
(45) Date of Patent: Jul. 30, 2019

(54) FASTBACK VORTICOR PIN

(71) Applicant: General Electric Company, Schenectady, NY (US)

(72) Inventors: Jason Randolph Allen, West Chester, OH (US); Robert David Briggs, West Chester, OH (US); Gulcharan Singh Brainch, West Chester, OH (US); Curtis Walton Stover, West Chester, OH (US)

(73) Assignee: General Electric Company, Boston, MA (US)

( * ) Notice: Subject to any disclaimer, the term of this patent is extended or adjusted under 35 U.S.C. 154(b) by 433 days.

(21) Appl. No.: 14/712,287

(22) Filed: May 14, 2015

(65) Prior Publication Data

US 2015/0345305 A1 Dec. 3, 2015

Related U.S. Application Data

(60) Provisional application No. 62/004,708, filed on May 29, 2014.

(51) Int. Cl.
*F01D 5/18* (2006.01)
*F28F 3/02* (2006.01)
(Continued)

(52) U.S. Cl.
CPC .............. *F01D 5/188* (2013.01); *F01D 5/187* (2013.01); *F05D 2250/14* (2013.01);
(Continued)

(58) Field of Classification Search
CPC ....... F05D 2260/221; F05D 2260/2212; F05D 2260/2214; F05D 2260/22141;
(Continued)

(56) References Cited

U.S. PATENT DOCUMENTS 4,293,275 A 10/1981 Kobayashi et al.
4,416,585 A 11/1983 Abdel-Messeh
(Continued)

FOREIGN PATENT DOCUMENTS

DE 19526917 A1 1/1997
DE 20105595 U1 6/2001
(Continued)

OTHER PUBLICATIONS

PCT Search Report and Written Opinion issued in connection with Related PCT Application No. PCT/US2015/057718 dated Jun. 16, 2016.
(Continued)

*Primary Examiner* — David E Sosnowski
*Assistant Examiner* — Eric J Zamora Alvarez
(74) *Attorney, Agent, or Firm* — McGarry Bair PC (57) ABSTRACT

A structure for disrupting the flow of a fluid comprises and a second lateral wall spaced apart from one another, yet joined, by a floor and a ceiling; and, (b) a vorticor pin extending in a direction parallel to an X-axis, the vorticor pin concurrently rising above and extending away from the floor to a height, in a direction parallel to a Y-axis, the vorticor pin comprising: (i) a front surface extending incompletely between the first lateral wall and the second lateral wall, the front surface extending above the floor and having an arcuate portion that is transverse with respect to a Z-axis, which is perpendicular to the X-axis and the Y-axis, and (ii) a rear surface extending between the first lateral wall and the second lateral wall, the rear surface extending between the front surface and the floor, the rear surface having an inclining section that tapers in height, taken parallel to the Y-axis, in a direction parallel to the Z-axis.

13 Claims, 6 Drawing Sheets

(51) Int. Cl.
*F28F 13/12* (2006.01)
*F28F 1/40* (2006.01)
*F28F 13/02* (2006.01)

(52) U.S. Cl.
CPC ...... *F05D 2250/16* (2013.01); *F05D 2250/23* (2013.01); *F05D 2250/231* (2013.01); *F05D 2250/292* (2013.01); *F05D 2260/2212* (2013.01); *F23R 2900/03045* (2013.01); *F28F 1/40* (2013.01); *F28F 3/022* (2013.01); *F28F 13/02* (2013.01); *F28F 13/12* (2013.01); *Y02T 50/676* (2013.01)

(58) Field of Classification Search
CPC ............ F05D 2250/00; F05D 2250/20; F05D 2250/21; F05D 2250/22; F05D 2250/23; F05D 2250/231; F05D 2250/10; F05D 2250/16; F05D 2250/14
See application file for complete search history.

(56) References Cited

U.S. PATENT DOCUMENTS

| | | |
|---|---|---|
| 4,446,693 A | 5/1984 | Pidcock et al. |
| 4,474,532 A | 10/1984 | Pazder |
| 4,515,526 A | 5/1985 | Levengood |
| 4,669,957 A | 6/1987 | Phillips et al. |
| 4,690,211 A * | 9/1987 | Kuwahara ............ B21C 37/207 138/38 |
| 4,775,296 A | 10/1988 | Schwarzmann et al. |
| 5,062,768 A | 11/1991 | Marriage |
| 5,096,379 A | 3/1992 | Stroud et al. |
| 5,288,207 A | 2/1994 | Linask |
| 5,344,283 A | 9/1994 | Magowan et al. |
| 5,361,828 A | 11/1994 | Lee et al. |
| 5,382,133 A | 1/1995 | Moore et al. |
| 5,395,212 A | 3/1995 | Anzai et al. |
| 5,538,394 A * | 7/1996 | Inomata ................. F01D 5/187 415/115 |
| 5,603,606 A | 2/1997 | Glezer et al. |
| 5,611,662 A | 3/1997 | Cunha |
| 5,626,017 A | 5/1997 | Sattelmayer |
| 5,681,144 A | 10/1997 | Spring et al. |
| 5,695,321 A | 12/1997 | Kercher |
| 5,704,763 A | 1/1998 | Lee |
| 5,735,126 A * | 4/1998 | Schulte-Werning ...... F23R 3/04 431/350 |
| 5,779,438 A | 7/1998 | Wilfert |
| 5,797,726 A | 8/1998 | Lee |
| 6,000,466 A | 12/1999 | Aoyagi et al. |
| 6,026,892 A | 2/2000 | Kim et al. |
| 6,099,251 A | 8/2000 | Lafleur |
| 6,174,134 B1 | 1/2001 | Lee et al. |
| 6,227,804 B1 | 5/2001 | Koga et al. |
| 6,234,755 B1 | 5/2001 | Bunker et al. |
| 6,241,468 B1 | 6/2001 | Lock et al. |
| 6,254,346 B1 | 7/2001 | Fukuno et al. |
| 6,287,075 B1 | 9/2001 | Kercher |
| 6,290,462 B1 | 9/2001 | Ishiguro et al. |
| 6,331,098 B1 | 12/2001 | Lee |
| 6,368,060 B1 | 4/2002 | Fehrenbach et al. |
| 6,383,602 B1 | 5/2002 | Fric et al. |
| 6,406,260 B1 | 6/2002 | Trindade et al. |
| 6,416,283 B1 | 7/2002 | Johnson et al. |
| 6,547,524 B2 | 4/2003 | Kohli et al. |
| 6,582,584 B2 | 6/2003 | Lee et al. |
| 6,607,355 B2 | 8/2003 | Cunha et al. |
| 6,609,884 B2 | 8/2003 | Harvey |
| 6,644,921 B2 | 11/2003 | Bunker et al. |
| 6,722,134 B2 | 4/2004 | Bunker |
| 6,868,060 B2 | 3/2005 | Barzegar et al. |
| 6,890,154 B2 | 5/2005 | Cunha |
| 6,896,509 B2 | 5/2005 | Carroni et al. |
| 6,916,150 B2 | 7/2005 | Liang |
| 6,932,573 B2 | 8/2005 | Liang |
| 6,939,102 B2 | 9/2005 | Liang |
| 6,981,846 B2 | 1/2006 | Liang |
| 6,984,102 B2 | 1/2006 | Bunker et al. |
| 7,094,031 B2 | 8/2006 | Lee et al. |
| 7,104,757 B2 | 9/2006 | Gross |
| 7,125,225 B2 * | 10/2006 | Surace ..................... F01D 5/16 416/96 R |
| 7,128,533 B2 | 10/2006 | Liang |
| 7,137,781 B2 | 11/2006 | Harvey et al. |
| 7,186,084 B2 * | 3/2007 | Bunker ................. F01D 5/187 416/241 R |
| 7,195,458 B2 | 3/2007 | Liang |
| 7,300,242 B2 | 11/2007 | Liang |
| 7,399,160 B2 | 7/2008 | Harvey et al. |
| 7,413,407 B2 | 8/2008 | Liang |
| 7,445,432 B2 | 11/2008 | Levine et al. |
| 7,520,723 B2 | 4/2009 | Liang |
| 7,534,089 B2 | 5/2009 | Liang |
| 7,547,191 B2 | 6/2009 | Liang |
| 7,553,534 B2 | 6/2009 | Bunker |
| 7,575,414 B2 * | 8/2009 | Lee ........................ F01D 5/186 415/115 |
| 7,637,720 B1 | 12/2009 | Liang |
| 7,665,965 B1 | 2/2010 | Liang |
| 7,690,892 B1 | 4/2010 | Liang |
| 7,699,583 B2 | 4/2010 | Cunha |
| 7,713,026 B1 | 5/2010 | Liang |
| 7,722,327 B1 | 5/2010 | Liang |
| 7,766,616 B2 | 8/2010 | Baldauf et al. |
| 7,806,658 B2 | 10/2010 | Liang et al. |
| 7,824,156 B2 | 11/2010 | Dellmann et al. |
| 7,866,948 B1 | 1/2011 | Liang |
| 7,938,624 B2 * | 5/2011 | Tibbott ................. F01D 5/187 415/115 |
| 7,985,050 B1 | 7/2011 | Liang |
| 8,052,390 B1 | 11/2011 | Liang |
| 8,066,484 B1 | 11/2011 | Liang |
| 8,186,942 B2 | 5/2012 | Haas |
| 8,408,872 B2 | 4/2013 | Briggs et al. |
| 8,672,613 B2 | 3/2014 | Bunker |
| 9,175,569 B2 * | 11/2015 | Bergholz, Jr. ............ F01D 5/18 |
| 2005/0042074 A1 | 2/2005 | Liang |
| 2005/0084371 A1 | 4/2005 | Fried et al. |
| 2006/0073011 A1 | 4/2006 | Lee et al. |
| 2006/0099073 A1 | 5/2006 | Djeridane et al. |
| 2007/0128029 A1 | 6/2007 | Liang |
| 2007/0297916 A1 | 12/2007 | Levine et al. |
| 2007/0297917 A1 | 12/2007 | Levine et al. |
| 2008/0164013 A1 | 7/2008 | Maziers |
| 2008/0267784 A1 | 10/2008 | Bolms et al. |
| 2009/0087312 A1 | 4/2009 | Bunker et al. |
| 2009/0145581 A1 | 6/2009 | Hoffman et al. |
| 2010/0040480 A1 | 2/2010 | Webster et al. |
| 2010/0170667 A1 * | 7/2010 | Bertolotti ................ F28F 1/124 165/166 |
| 2010/0221121 A1 | 9/2010 | Liang |
| 2010/0226761 A1 | 9/2010 | Liang |
| 2010/0226791 A1 | 9/2010 | Fujimura et al. |
| 2010/0247328 A1 | 9/2010 | Cunha |
| 2010/0303635 A1 | 12/2010 | Townes et al. |
| 2011/0038709 A1 | 2/2011 | Liang et al. |
| 2011/0164960 A1 | 7/2011 | Maldonado |
| 2012/0070306 A1 | 3/2012 | Lee et al. |
| 2012/0207591 A1 * | 8/2012 | Lee ........................ F01D 5/187 415/191 |
| 2012/0324897 A1 * | 12/2012 | McMahan ............ F01D 9/023 60/752 |
| 2013/0089434 A1 | 4/2013 | Simpson et al. |

(56) References Cited

U.S. PATENT DOCUMENTS

| | | | | |
|---|---|---|---|---|
| 2013/0108416 A1* | 5/2013 | Piggush | ............. | F01D 5/187 415/173.1 |
| 2013/0205790 A1 | 8/2013 | Xu et al. | | |
| 2013/0209228 A1 | 8/2013 | Xu | | |
| 2013/0209229 A1 | 8/2013 | Xu et al. | | |
| 2013/0280092 A1* | 10/2013 | Xu | ............. | F01D 5/187 416/97 R |
| 2014/0219814 A1 | 8/2014 | Heselhaus | | |

FOREIGN PATENT DOCUMENTS

| | | | |
|---|---|---|---|
| DE | 102008037384 | A1 | 4/2009 |
| EP | 0845580 | A2 | 6/1998 |
| EP | 1118747 | A2 | 7/2001 |
| EP | 1655453 | A1 | 5/2006 |
| EP | 1882818 | A1 | 1/2008 |
| EP | 1975372 | A1 | 10/2008 |
| EP | 2087206 | A1 | 8/2009 |
| EP | 2107215 | A1 | 10/2009 |
| GB | 2262314 | A | 6/1993 |
| GB | 2358226 | A | 7/2001 |
| JP | 08505921 | A | 6/1996 |
| JP | 08338202 | A | 12/1996 |
| JP | 3040590 | B2 | 5/2000 |
| JP | 3124109 | B2 | 1/2001 |
| JP | 3182602 | B2 | 7/2001 |
| JP | 3586637 | B2 | 11/2004 |
| JP | 2006105141 | A | 4/2006 |
| JP | 2008506061 | A | 2/2008 |
| WO | 2014055259 | A1 | 4/2014 |

OTHER PUBLICATIONS

Great Britain Search Report and Opinion issued in connection with related GB Application No. 1015936.6 dated Jan. 14, 2011.
U.S. Non-Final Office Action issued in connection with Related U.S. Appl. No. 12/618,241 dated Aug. 10, 2012.
Unofficial English Translation of Japanese Office Action issued in connection with related JP Application No. 2010208729 dated Jun. 3, 2014.
Unofficial English Translation of Japanese Notice of Allowance issued in connection with related JP Application No. 2010208729 dated Jul. 22, 2014.
Great Britain Office Action issued in connection with related GB Application No. 1015936.6 dated May 28, 2015.
Great Britain Office Action issued in connection with related GB Application No. 1015936.6 dated Aug. 11, 2015.
Canadian Office Action issued in connection with Related CA Application No. 2714543 dated Jun. 29, 2016.
GE Related Case Form.
PCT Search Report and Written Opinion issued in connection with corresponding PCT Application No. PCT/US2015/033240 dated Oct. 8, 2015.
European Search Report and Opinion issued in connection with corresponding EP Application No. 15168677.1 dated Nov. 2, 2015.
European Search Report and Opinion issued in connection with related EP Application No. 15192372.9 dated Mar. 4, 2016.
European Search Report and Opinion issued in connection with related EP Application No. 15192458.6 dated Mar. 8, 2016.
European Office Action issued in connection with corresponding EP Application No. 15168677.1 dated Jul. 4, 2017.

* cited by examiner

FASTBACK VORTICOR PIN

CROSS-REFERENCE TO RELATED APPLICATION

This application claims priority to U.S. Provisional Application Ser. No. 62/004,708, filed May 29, 2014, the disclosure of which is incorporated herein by reference.

BACKGROUND

The technology described herein relates generally to heat transfer in gas turbine engines and more particularly to apparatus for cooling structures in such engines.

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. The combustor and HPT components operate in an extremely high temperature environment, and must be cooled by air flow to ensure adequate service life.

Cooling air flow is typically provided by utilizing relatively lower-temperature "bleed" air extracted from an upstream part of the engine, for example the high pressure compressor, and then feeding that bleed air to high-temperature downstream components. The bleed air may be utilized in numerous ways, for example through internal convection cooling or through film cooling or both. Preexisting usage of bleed air and other cooling air flows the air over rib rougheners, trip strips, and pin fins. When used for convection cooling, the bleed air is often routed through serpentine passages or other structures according to an overall source-to-sink pressure difference, which generates fluid velocity distributions and associated heat transfer coefficient distributions as the cooling air passes through them. Because bleed air represents a loss to the engine cycle and reduces efficiency, it is desired to maximize heat transfer rates and thereby use the minimum amount of cooling flow possible. For this reason heat transfer improvement structures, such as pin fins or turbulators may be employed as integral portions of the cooled interior component surfaces.

Conventional turbulators are elongated strips or ribs having a generally square, rectangular, or other symmetric cross-section, and are generally aligned transverse to the average bulk direction of flow in a channel or near the surface. The turbulators serve to periodically "trip" the boundary layer across the entire width of a flow passage at the component interior surface and thereby enhance mixing of the near wall and bulk flows, promote flow turbulence, and increase surface heat transfer coefficients. Cooling effectiveness may thereby be increased. One problem with the use of conventional turbulators is that a flow recirculation zone is present downstream of each turbulator. This zone causes particulates entrained in the cooling air to be circulated, further interact with surfaces or deposit, and build up behind the turbulator. This build-up results in an insulating layer which reduces heat transfer rates to the cooling flow by increasing thermal resistance.

In lieu of turbulators or in addition thereto, a conventional pin fin has a generally symmetric shape of constant cross section with height, such as round, elliptic, or square, and results in a stagnation region at its leading face and a flow separation and recirculation region, or wake, aft of the feature. The wake region in particular can be relatively large, serving to churn the flow, but also to collect particulates within the recirculation zones. Consequently, there is a need for a cooling promoting device that does not necessarily span an entire widthwise dimension of a flow passage, but at the same time promotes turbulent flow without the adverse effects of wakes caused by conventional pin fins.

BRIEF DESCRIPTION

A structure for disrupting the flow of a fluid, the structure comprising: (a) a first lateral wall and a second lateral wall spaced apart from one another, yet joined, by a floor and a ceiling; and, (b) a vorticor pin extending incompletely between the first lateral wall and the second lateral wall in a direction parallel to an X-axis, the vorticor pin concurrently rising above and extending away from the floor to a height less than a maximum height of either the first lateral wall or the second lateral wall, the vorticor pin comprising: (i) a front surface extending incompletely between the first lateral wall and the second lateral wall, the front surface extending above the floor and being angled with respect to a Y-axis extending perpendicularly from the floor, where the X-axis is perpendicular to the Y-axis, and where an arcuate portion of the front surface extends in a X-Z plane, and (ii) a rear surface extending incompletely between the first lateral wall and the second lateral wall, the rear surface extending between the front surface and the floor, the rear surface having an inclining section that is angled between zero and forty-five degrees with respect to a Z-axis being perpendicular to the Y-axis and perpendicular to the X-axis, a first portion of the inclining section is spaced apart from the floor a first distance parallel to the Y-axis, a second portion of the inclining section being spaced apart from the floor a second distance parallel to the Y-axis, where the vorticor pin has a median width dimension parallel to the X-axis that is less than a median length dimension parallel to the Z-axis.

BRIEF DESCRIPTION OF THE DRAWINGS

The disclosure may be best understood by reference to the following description taken in conjunction with the accompanying drawing figures in which.

DETAILED DESCRIPTION

The exemplary embodiments are described and illustrated below to encompass methods and devices for maintaining and promoting non-laminar flow of fluids. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

According to a first aspect of the present disclosure, there is provided a structure for disrupting the flow of a fluid, the structure comprising: (a) a first lateral wall and a second lateral wall spaced apart from one another, yet joined, by a floor and a ceiling; and, (b) a vorticor pin extending incompletely between the first lateral wall and the second lateral wall in a direction parallel to an X-axis, the vorticor pin concurrently rising above and extending away from the floor to a height less than a maximum height of either the first lateral wall or the second lateral wall, the vorticor pin comprising: (i) a front surface extending between the first lateral wall and the second lateral wall, the front surface extending above the floor and being angled with respect to a Y-axis extending perpendicularly from the floor, where the X-axis is perpendicular to the Y-axis, and where an arcuate portion of the front surface extends in a X-Z plane, and (ii) a rear surface extending between the first lateral wall and the second lateral wall, the rear surface extending between the front surface and the floor, the rear surface having an inclining section that is angled between zero and forty-five degrees with respect to a Z-axis being perpendicular to the Y-axis and perpendicular to the X-axis, a first portion of the inclining section is spaced apart from the floor a first distance parallel to the Y-axis, a second portion of the inclining section being spaced apart from the floor a second distance parallel to the Y-axis.

In another feature of the first aspect, the vorticor pin has a median width dimension parallel to the X-axis that is less than a median length dimension parallel to the Z-axis. In yet another feature of the first aspect, the vorticor pin further includes opposing side surfaces that are parallel to one another and extend between the front surface and the rear surface. In a further feature of the first aspect, the vorticor pin further includes opposing side surfaces that are tapered and extend between the front surface and the rear surface. In still a further feature of the first aspect, the opposing side surfaces are angled less than one hundred thirty degrees with respect to one another. In yet a further feature of the first aspect, the opposing side surfaces, the rear surface, and the floor converge at a point. In an additional feature of the first aspect, the vorticor pin includes opposing side surfaces having a second arcuate portion extending in the X-Z plane. In yet another additional feature of the first aspect, the vorticor pin includes opposing side surfaces having a second arcuate portion extending in an X-Y plane. In still another feature of the first aspect, the arcuate portion has a circular curvature. In still an even further feature of the first aspect, the front surface has a uniform profile extending in a direction parallel to the Y-axis.

In another feature of the first aspect, the rear surface has an arcuate profile extending in a Y-Z plane. In yet another feature of the first aspect, the arcuate portion has a spherical curvature. In a further feature of the first aspect, the arcuate portion is angled less than fifty degrees with respect to the Y-axis. In still a further feature of the first aspect, the front surface circumscribes the rear surface.

According to a second aspect of the present disclosure, there is provided a structure for disrupting the flow of a fluid, the structure comprising: (a) a first lateral wall and a second lateral wall spaced apart from one another, yet joined, by a floor and a ceiling; and, (b) a vorticor pin extending incompletely between the first lateral wall and the second lateral wall in a direction parallel to an X-axis, the vorticor pin concurrently rising above and extending away from the floor to a height, in a direction parallel to a Y-axis, to provide a gap between the vorticor pin and the ceiling, the vorticor pin comprising: (i) a front surface extending incompletely between the first lateral wall and the second lateral wall, the front surface extending above the floor and having an arcuate portion that is transverse with respect to a Z-axis, which is perpendicular to the X-axis and the Y-axis, and (ii) a rear surface extending between the first lateral wall and the second lateral wall, the rear surface extending between the front surface and the floor, the rear surface having an inclining section that tapers in height, taken parallel to the Y-axis, in a direction parallel to the Z-axis.

In another feature of the second aspect, the vorticor pin has a median width dimension parallel to the X-axis that is less than a median length dimension parallel to the Z-axis. In yet another feature of the second aspect, the vorticor pin further includes opposing side surfaces that are parallel to one another and extend between the front surface and the rear surface. In a further feature of the second aspect, the vorticor pin further includes opposing side surfaces that are tapered and extend between the front surface and the rear surface. In still a further feature of the second aspect, the opposing side surfaces are angled less than one hundred thirty degrees with respect to one another. In yet a further feature of the second aspect, the opposing side surfaces, the rear surface, and the floor converge at a point. In an additional feature of the second aspect, the vorticor pin includes opposing side surfaces having a second arcuate portion extending in the X-Z plane. In yet another additional feature of the second aspect, the vorticor pin includes opposing side surfaces having a second arcuate portion extending in an X-Y plane. In still another feature of the second aspect, the arcuate portion has a circular curvature. In still an even further feature of the second aspect, the front surface has a uniform profile extending in a direction parallel to the Y-axis.

In another feature of the second aspect, the rear surface has an arcuate profile extending in a Y-Z plane. In yet another feature of the second aspect, the arcuate portion has a spherical curvature. In a further feature of the second aspect, the arcuate portion is angled less than fifty degrees with respect to the Y-axis. In still a further feature of the second aspect, the front surface circumscribes the rear surface. In yet another feature of the second aspect, the vorticor pin has a median width dimension parallel to the X-axis that is less than a median length dimension parallel to the Z-axis. In still yet another feature of the second aspect, the vorticor pin has a median width dimension parallel to the X-axis that is greater than a median length dimension parallel to the Z-axis.

Figure 1:
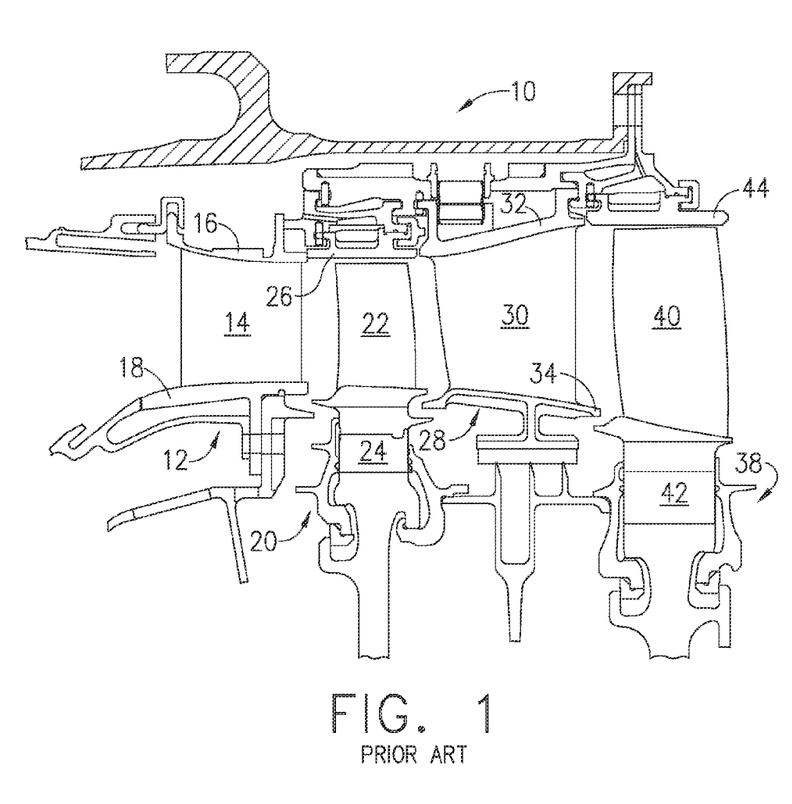
FIG. 1 is a cross-sectional view of a high pressure turbine section of a gas turbine engine.

Referring to FIG. 1, an exemplary gas turbine engine includes a high pressure turbine section 10 downstream from a combustor section (not shown). The function of the high pressure turbine section 10 is to convert kinetic energy from high-temperature, pressurized combustion gases arriving from the upstream combustor into mechanical energy in the form of mechanical work. Those skilled in the art are knowledgeable with the general component of a gas turbine engine and, accordingly, a detailed explanation of each section preceding the high pressure turbine section 10 has been omitted in furtherance of brevity.

The high pressure turbine section 10 includes a first stage nozzle 12 comprising a plurality of circumferentially distributed and spaced apart first stage vanes 14 that are supported between outer and inner bands 16, 18. In exemplary form, the first stage nozzle 12 comprises a plurality of nozzle segments mounted with respect to one another to collectively form a complete 360° assembly, where each nozzle segment includes a pair of first stage vanes 14, an outer band segment 16, and an inner band segment 18. The first stage outer and inner bands 16, 18 and vanes define an enclosed pathway directing the combustion gases to a first stage rotor 20.

The first stage rotor section 20 includes a series of first stage turbine blades 22 extending from a first stage disk 24. A segmented first stage shroud 26 is arranged to surround the first stage turbine blades 22. As the hot combustion gases pass over the turbine blades 22, the energy of the combustion gases is partially converted into mechanical energy by rotating the blades 22 and disk 24 around a central axis. After passing over the blades 22, the combustion gases enter a second stage nozzle section 28.

The second stage nozzle section 28 comprises a plurality of circumferentially spaced hollow second stage vanes 30 that are supported between a second stage outer band 32 and a second stage inner band 34. In exemplary form, the second stage nozzle section 28 comprises a plurality of nozzle segments mounted with respect to one another to collectively form a complete 360° assembly, where each nozzle segment includes a pair of second stage vanes 30, a second stage outer band segment 32, and second stage inner band segment 34. The second stage outer and inner bands 32 and 34 cooperate with the second stage vanes 30 to demarcate combustion gases flowpath boundaries upon receiving the combustion gases from the first stage rotor 20, which after flowing through the second stage nozzle section 28 continues on to the second stage rotor section 38. It should be noted that the foregoing is an example only. Other designs exist for example, where the segments are not each of two nozzles.

The second stage rotor section 38 includes a radial array of second stage turbine blades 40 extending from a second stage disk 42. A segmented second stage shroud 44 is arranged to surround the second stage turbine blades 40. As the combustion gases pass over the turbine blades 40, the energy of the combustion gases is partially converted into mechanical energy by rotating the blades 40 and disk 42 around a central axis.

Given the extreme temperatures that the components of the high pressure turbine section 10 are subjected to, cooling many of these components becomes advantageous to increase component longevity. In order to cool the components, several approaches have been utilized, including providing for cooling fluid passages through the components. In the case of the first and second stage nozzle sections 12, 28, cooling fluid flows through passages that extend through the outer and inner bands 16, 18, 32, 34, into interior cavities in the vanes 14, 30, where the cooling fluid egresses through a plurality of orifices on the exterior of the vanes. Similarly, in the case of the first and second stage rotor sections 20, 38, cooling fluid flows through passages that extend into interior cavities in the blades 22, 40, where the cooling fluid egresses through a plurality of orifices on the exterior of the blades.

Figure 3:
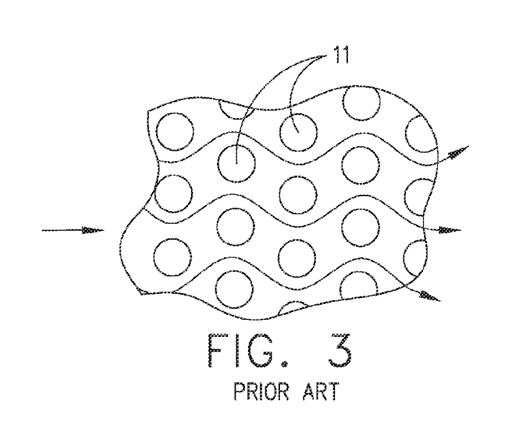
FIG. 3 is a prior art overhead view of a plurality of conventional cylindrical pin fins.
Figure 4:
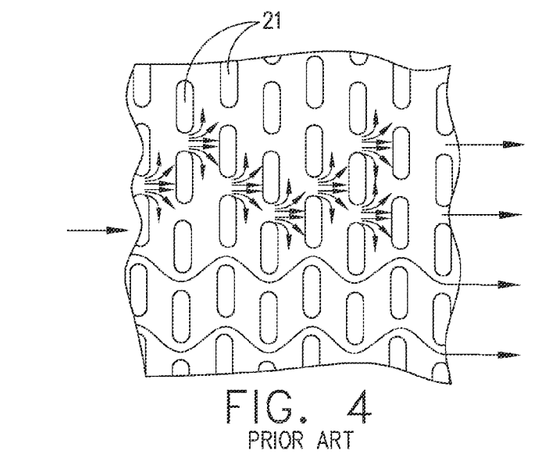
FIG. 4 is a prior art overhead view of a plurality of conventional oblong pin fins.
Figure 5:
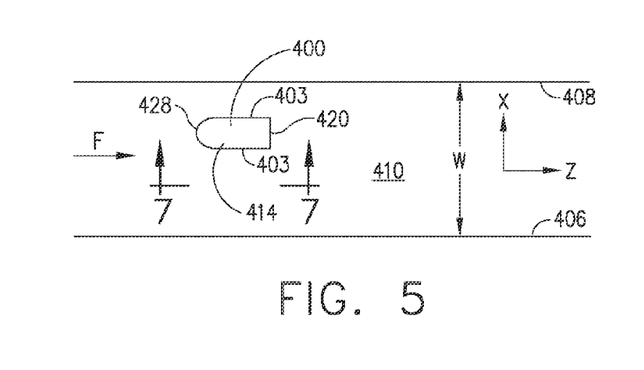
FIG. 5 is a top view of a first exemplary embodiment of a vorticor pin.
Figure 6:
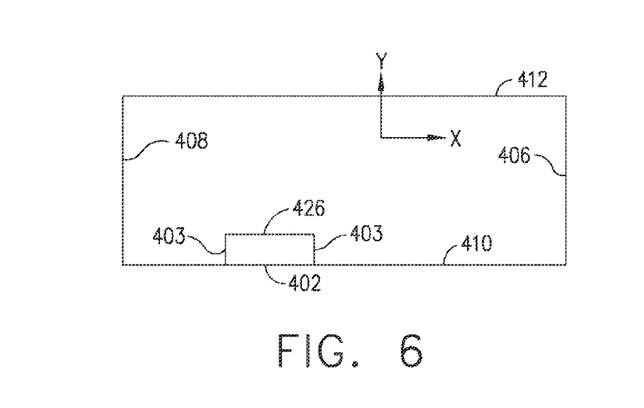
FIG. 6 is a front view of the first exemplary embodiment of FIG. 5.
Figure 7:
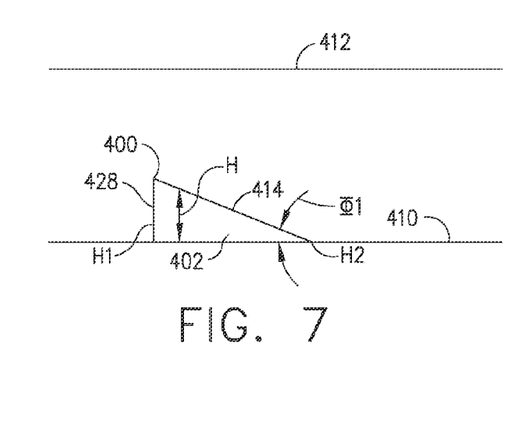
FIG. 7 is a profile view of the first exemplary embodiment of FIG. 5.

As shown in FIGS. 3 and 4, it is known to use pin fins within cooling conduits for turbine blades. Those skilled in the art understand that in order to increase the convective heat transfer from the components of the high pressure turbine section 10 to the cooling fluid, the cooling fluid should be turbulent and boundary layers between the high pressure turbine section 10 components and the cooling fluid should be reduced. Yet FIG. 3 depicts a series of round pin fins 11, whereas FIG. 4 depicts a series of oblong pin fins 21, where these prior art pin fins have generous wake regions at the rear of the pin fins and downstream from the pin fins. These wake regions foster deposition of solid entrained particulates flowing within the cooling fluid. And deposition of these particulates leads to reduced heat transfer.

In contrast to the prior art pin fins 11, 21, a plurality of novel "vorticor pins" may be included within the cooling channels of the high pressure turbine section 10 components. As used herein, "vorticor pin" refers to a structure extending from a surface that is utilized to promote fluid vortices across the surface and retard the formation of wake regions at the rear of the pins, where the surface may be an open surface or may be a closed surface that is bounded on multiple sides. In exemplary form, a vorticor pin includes dimensions of length, width, and height, where these dimensions are all approximately the same or within a factor of about five of each other. Vorticor pins may be present on the interior of a cooling conduit bounded on all sides so that the vorticor pin extends into the cooling conduit, but not completely between opposing walls of the conduit. Vorticor pins serve to disrupt the flow of the cooling fluid flowing through the cooling channel to promote vortices as part of creating and maintaining vortical fluid flow elements. Vortical flow elements proximate the high pressure turbine section 10 component surface increases the rate of convective heat transfer from the components to the cooling fluid.

Figure 2:
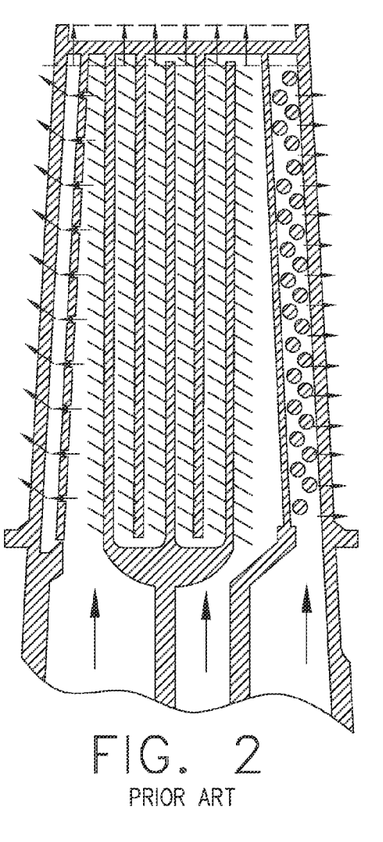
FIG. 2 is a cross-sectional view of a prior art blade showing cooling channels.

One or more vorticor pins may be associated with any of the components of the high pressure turbine section 10 including, without limitation, vanes, blades, bands, and disks. By way of example, FIG. 2 shows an internal cross-section of a prior art blade having a series of cooling channels distributed therethrough. Similar channels can be found in other vanes, bands, disks, and combustor components (e.g., case and diffuser), which are known to those skilled in the art and need not be discussed in great detail.

Exemplary vorticor pins in accordance with the instant disclosure may exhibit various geometries, but all vorticor pins have in common an upright front surface that generally faces the oncoming direction of cooling airflow F, and a rear surface that defines a ramp-like shape inclining/declining from the front surface toward at least one of a lateral wall, a floor, and/or a ceiling.

As shown specifically in FIGS. 5-8, a first exemplary vorticor pin 400 includes an arcuate front surface 402 and a rear surface 414, both extending above a floor 410. For purposes of explanation only, a coordinate system is established as part of describing the features of the exemplary vorticor pin 400, where a Y-axis extends perpendicularly from the floor 410, an X-axis extends perpendicularly from Y-axis in the lateral or widthwise direction W, and a Z-axis extends perpendicularly from the X-axis and the Y-axis parallel to the direction of fluid flow F. In this exemplary embodiment, the vorticor pin 400 includes a triangular cross-section taken along the X-direction (coaxial with the X-axis), where the hypotenuse of the triangle is the rear surface and the two legs comprise the front surface 402 and the floor 410. The front surface 402 faces and is transverse to the direction of airflow F (and the Z-axis) and may be angled between zero and forty-five degrees with respect to the Y-axis. By way of example, the accompanying drawings depict the front surface 402 as being angled zero degrees with respect to the Y-axis.

The front surface 402 includes a height (measured in the Y-direction) that varies in the widthwise direction W (parallel to the X-axis) and in the longitudinal direction (parallel to the Z-axis). The front surface 402 extends between opposing vertical, lateral walls 406, 408 that extend along the Y and Z axes, but does not completely span the lateral walls 406, 408. By way of exemplary discussion, the lateral walls 406, 408 are bridged by the floor 410 and ceiling 412, each of which extends along the X and Z axes. In exemplary form, the floor 410 comprises a planar surface, whereas the walls 406, 408 also embody planar surfaces that each extends perpendicular to the floor. It should be noted, however, that the opposing walls 406, 408 need not be planar, nor angled perpendicularly with respect to the floor 410. Likewise, it should be understood that the floor 410 need not be planar or angled perpendicularly with respect to either or both of the lateral walls 406, 408.

In this exemplary vorticor pin 400, the rear surface 414 may completely extend from the floor 410 to a terminal arcuate edge 426 (i.e., top edge) of the front surface 402 vertically spaced above the floor with the exception of where the arcuate edge meets the floor 410. The rear surface 414 is inclined at an angle □1 with respect to that Z-axis that may be constant or vary across the lateral widthwise dimension W (along the X axis). Said another way, the length of the rear surface 414 (between the terminal edge 426 and the line of termination 420 in the Z-axis direction) is nonuniform across the widthwise dimension W.

In this exemplary vorticor pin 400, the rear surface 414 may completely extend from the floor 410 to a terminal arcuate edge 426 (i.e., top edge) of the front surface 402 vertically spaced above the floor with the exception of where the arcuate edge meets the floor 410. The rear surface 414 is inclined at an angle $\phi 1$ with respect to that Z-axis that may be constant or vary across the lateral widthwise dimension W (along the X axis). Said another way, the length of the rear surface 414 (between the terminal edge 426 and the line of termination 420 in the Z-axis direction) is nonuniform across the widthwise dimension W.

Figure 8:
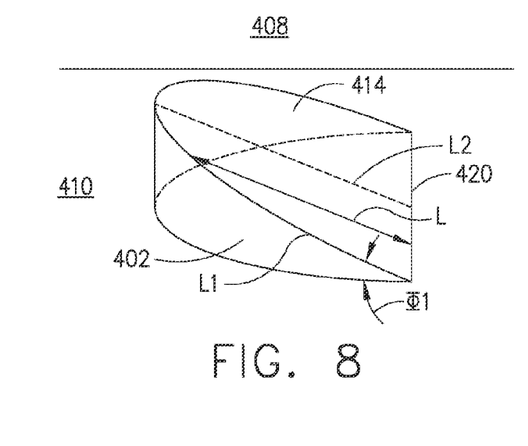
FIG. 8 is an elevated perspective view from the front left of the first exemplary embodiment of FIG. 5.

Referring specifically to FIG. 8, the angle $\phi 1$ (measured between the floor 410 and the rear surface 414) may be selected to be large enough so that the vorticor pin 400 has a reasonable overall length in the direction of cooling air flow F, but preferably not so large that a flow recirculation zone would be present during operation. As an example, the angle $\phi 1$ may be uniform across the lateral widthwise dimension W (parallel to the X-axis) or the angle $\phi 1$ may vary across the widthwise dimension W. In this exemplary embodiment, the angle $\phi 1$ is depicted in the figures as being uniform across the widthwise dimension W. In exemplary form, the angle $\phi 1$ may average about 45° or less. More specifically, the angle $\phi 1$ may average approximately 30°. By way of further example, for purposes of illustration in the figures only, angle $\phi 1$ is 20 degrees.

Referring back to FIGS. 5-8, this first exemplary vorticor pin 400 includes a rear surface 414 with a length that varies laterally. This variance in length is the product of a front surface 402 having an arcuate contour. In exemplary form, the minimum length $L_1$ of the rear surface 414 occurs at the lateral ends of the vorticor pin 400, whereas the maximum length $L_2$ of the rear surface occurs at the vertex 428 of the parabolic contour. By way of example, this vertex 428 is centered with respect to the lateral dimensions of the vorticor pin 400. Those skilled in the art will understand that the lengths $L_1$, $L_2$ may vary depending upon various factors such as the angle $\phi 1$ chosen.

In this exemplary vorticor pin 400, the front surface 402 comprises an arcuate surface having an arcuate shape that extends vertically in the Y-direction from the floor 410. Moreover, the front surface 402 merges with lateral segments 403 that are generally planar, are generally parallel to one another, and set forth the widthwise bounds of the vorticor pin 400. For purposes of this exemplary embodiment, generally parallel to one another means that the lateral segments 403 are angled with respect to one another no more than twenty degrees. Consistent with the uniform angle $\phi 1$, the height H of the vorticor pin 400 changes along the length of the terminal arcuate edge 426 from a maximum height $H_1$ at the vertex to a minimum height $H_2$ where the terminal arcuate edge meets the floor 410 and the height of the lateral segments 403 is zero. And it is also within the scope of this disclosure for the maximum height of the front surface 402 to be located other than the vertex of the terminal arcuate edge 426. In exemplary form, a line of termination 420 is formed where the rear surface 414 meets the floor 410 and this line of termination may be parallel to a tangent line of the vertex 428. In circumstances where the angle $\phi 1$ varies in the X-direction, for example, the line of termination 420 may not be parallel to a tangent line at the vertex 428.

Figure 9:
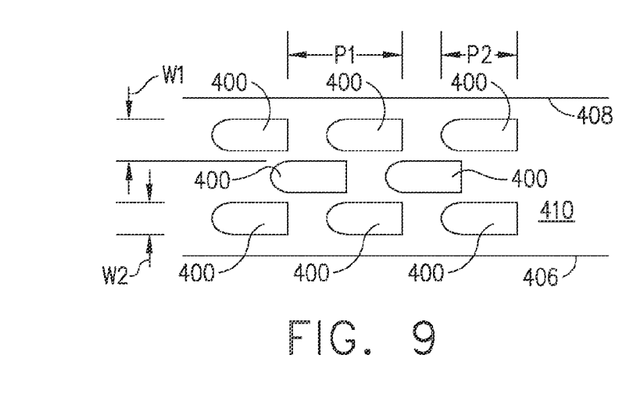
FIG. 9 is a top view a series of the exemplary embodiments of FIG. 5 distributed within a cooling channel.

As shown in FIG. 9, the exemplary vorticor pins 400 may be arranged in rows (three rows shown, in a staggered configuration) and there may be a correlation between the spacing of the pins 400 and the dimensions of the pins themselves. In exemplary form, the longitudinal length between repeating pins 400 within a row is represented by P1, whereas the longitudinal length of each pin 400 within that same row is represented by P2. By way of guidance, design parameters may be established for longitudinal spacing of the pins within a row, where the ratio of P1 to P2 (P1/P2) is between 2.0 to 10.0. In further exemplary form, the lateral width between repeating pins 400 across adjacent rows is represented by W1, whereas the lateral width of each pin 400 within a row is represented by W2. By way of guidance, design parameters may be established for lateral spacing of the pins, where the ratio of W1 to W2 (W1/W2) is between 3.0 to 6.0. These parameters are exemplary in nature and may be departed from based upon various considerations known to those skilled in the art.

In circumstances where particulates are deposited and the surface of the component is intended for convective heat transfer, as introduced previously, these particulates act as insulators and reduce thermal transfer between the flowing fluid and the intended heat transfer surface. These particulates tend to become trapped in flow recirculation and separation regions leading to a higher probability of accumulation and the formation of a thermal resistance. By using one or more vorticor pins 400, reduction of the stagnation and recirculation flow regions in comparison to the conventional cooling enhancement methods can be achieved.

Figure 10:
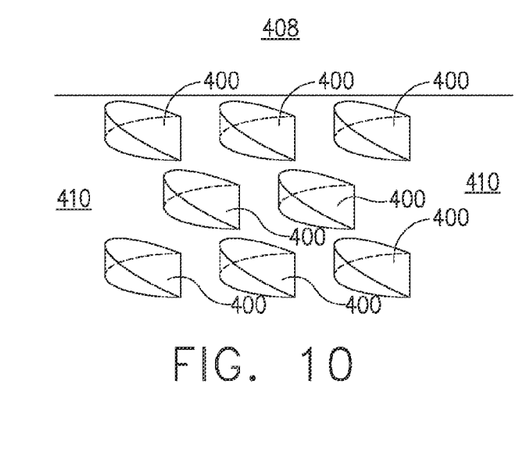
FIG. 10 is an elevated perspective view from the front left of the series of the exemplary embodiments shown in FIG. 9.
Figure 11:
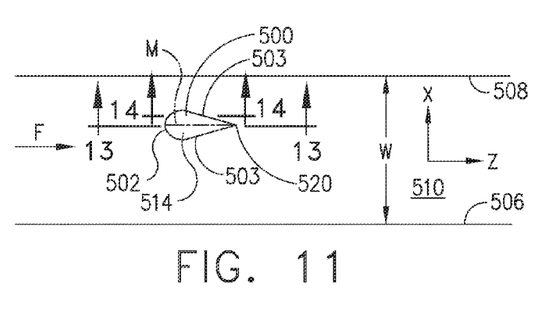
FIG. 11 is a top view of a second exemplary embodiment of a vorticor pin.
Figure 12:
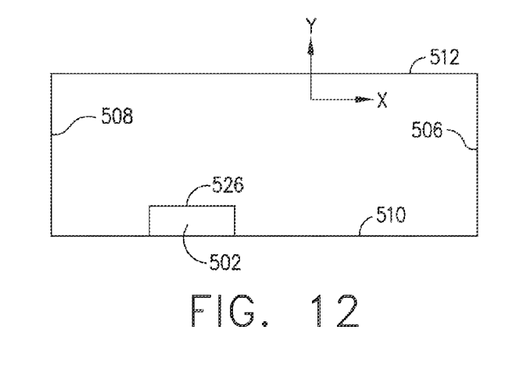
FIG. 12 is a front view of the second exemplary embodiment of FIG. 11.
Figure 13:
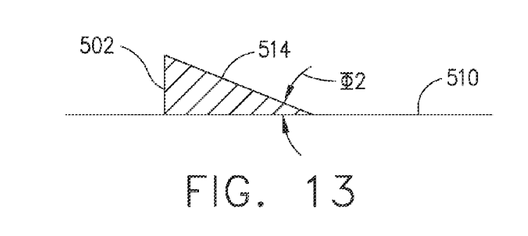
FIG. 13 is a first cross-sectional view of the second exemplary embodiment of FIG. 11 taken along line 13-13.

For example, as shown in FIGS. 9 and 10, the vorticor pin 400 may be repeated to further reduce stagnate airflow. In this exemplary configuration, a series of vorticor pins 400 are positioned in aligned longitudinal rows (three pins in the first row, two pins in the second row, and three pins in the third row), with the rows staggered laterally. It should be noted, however, that the vorticor pins 400 may be arranged differently than as shown in FIGS. 9 and 10. For example, the rows of pins 400 may be aligned both laterally and longitudinally. Moreover, the pins 400 may be arranged to create the absence of lateral and/or longitudinal rows.

As shown specifically in FIGS. 11-15, a second exemplary vorticor pin 500 includes an arcuate front surface 502, tapered side surfaces 503, and a rear surface 514, both extending above a floor 510. For purposes of explanation only, the same coordinate system will be utilized as was described previously for the first exemplary vorticor pin 400. In this exemplary embodiment, the vorticor pin 500 includes a triangular or a quadrilateral cross-section (taken along the X-direction, coaxial with the X-axis) depending upon where the cross-section is taken. More specifically, if the cross-section is taken at the position [528] farthest from a point of termination of the vorticor pin 500, the cross-section is triangular. If taken at other locations laterally displaced from the position [528], the cross-section is quadrilateral. In exemplary form, the front surface 502 is semi-circular in horizontal cross-section (taken along the Y-axis) and its radial ends meet corresponding ends of each of the tapered side surfaces 503. By way of example, the side surfaces 503 are planar and angled the same with respect to a widthwise midline M so that the side surfaces eventually converge at a point of termination 520. In exemplary form, the angle between the side surfaces and a longitudinal dashed line parallel to the Z-axis is represented by "θ". For purposes of graphical depiction only, the side surfaces are angled approximately twenty degrees with respect to the longitudinal dashed line. It should be noted, however, that the angle θ may be chosen to be at any angle in order to converge the side surfaces 503 at a point of termination 520.

The arcuate front surface 502 faces and is transverse to the direction of airflow F (and the Z-axis) and may be angled between zero and forty-five degrees with respect to the Y-axis. By way of example, the accompanying drawings depict the front surface 502 as being angled zero degrees with respect to the Y-axis. The arcuate front surface 502 includes a height (measured in the Y-direction) that varies in the widthwise direction W (parallel to the X-axis) and in the longitudinal direction (parallel to the Z-axis). The front surface 502 extends between opposing vertical, lateral walls 506, 508 that extend along the Y and Z axes, but does not completely span the lateral walls 506, 508.

By way of exemplary discussion, the lateral walls 506, 508 are bridged by the floor 510 and ceiling 512, each of which extends along the X and Z axes. In exemplary form, the floor 510 comprises a planar surface, whereas the walls 506, 508 also embody planar surfaces that each extends perpendicular to the floor. It should be noted, however, that the opposing walls 506, 508 need not be planar, nor angled perpendicularly with respect to the floor 510. Likewise, it should be understood that the floor 510 need not be planar or angled perpendicularly with respect to either or both of the lateral walls 506, 508.

In this exemplary vorticor pin 500, the rear surface 514 may completely extend from the floor 510 to a terminal edge 526 (i.e., top edge) of the front surface 502 and the tapered side surfaces 503 vertically spaced above the floor with the exception of where the terminal edge meets the floor 510. The rear surface 514 is inclined at an angle $\phi2$ with respect to that Z-axis that may be constant or vary across the lateral widthwise dimension W (along the X axis). Said another way, the length of the rear surface 514 (between the terminal edge 526 and the point of termination 520 in the Z-axis direction) is nonuniform across the widthwise dimension W.

Figures 14, 15:
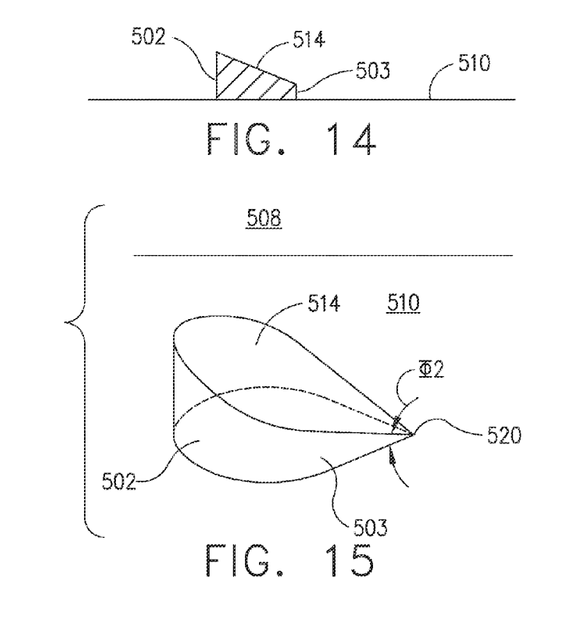
FIG. 14 is a second cross-sectional view of the second exemplary embodiment of FIG. 11 taken along line 14-14.
FIG. 15 is an elevated perspective view from the front left of the second exemplary embodiment of FIG. 11.

Referring specifically to FIG. 15, the angle $\phi2$ (measured between the floor 510 and the rear surface 514) may be selected to be large enough so that the vorticor pin 500 has a reasonable overall length in the direction of cooling air flow F, but preferably not so large that a flow recirculation zone would be present during operation. As an example, the angle $\phi2$ may be uniform across the lateral widthwise dimension W (parallel to the X-axis) or the angle $\phi2$ may vary across the widthwise dimension W. In this exemplary embodiment, the angle $\phi2$ is depicted in the figures as being uniform across the widthwise dimension W. In exemplary form, the angle $\phi2$ may average about 45° or less. More specifically, the angle $\phi2$ may average approximately 30°. By way of further example, for purposes of illustration in the figures only, angle $\phi2$ is 20 degrees.

Referring back to FIGS. 11-15, this second exemplary vorticor pin 500 includes a rear surface 514 with a length that varies laterally. This variance in length is the product of a front surface 502 having an arcuate contour and the tapered side surfaces 503 meeting one another at the point of termination 520. In exemplary form, the minimum length of the rear surface 514 occurs where the front surface 502 joins the tapered side surfaces 503, whereas the maximum length of the rear surface occurs where the front surface 502 is spaced longitudinally the farthest from the point of termination 520, in this case along the widthwise midline M of the vorticor pin 500. Those skilled in the art will understand that the minimum lengths and the maximum length may vary depending upon various factors such as the angle $\phi2$ chosen.

In this exemplary vorticor pin 500, the front surface 502 comprises an arcuate surface having an arcuate contour that extends vertically in the Y-direction from the floor 510. Moreover, the front surface 502 merges with opposing tapered segments 503 that are generally planar, are not generally parallel to one another, and set forth a portion of the widthwise bounds of the vorticor pin 500. For purposes of this exemplary embodiment, generally parallel to one another means that the lateral segments 403 are angled with respect to one another no more than twenty degrees. Consistent with the uniform angle $\phi2$, the height [H] of the vorticor pin 500 changes along the length of the terminal arcuate edge 526 from a maximum height [$H_3$] at the farthest longitudinal point from the point of termination 520 to a minimum height [$H_2$] where the terminal arcuate edge meets the floor 510 and the height of the tapered side surfaces 503 is zero. And it is also within the scope of this disclosure for the maximum height of the vorticor pin 500 to be located other than along the widthwise midline M. In exemplary form, a point of termination 520 is formed where the rear surface 514, the tapered side surfaces 503, and floor 510 all meet, which lies upon the widthwise midline. In circumstances where the taper of the side surfaces 503 is not uniform, the point of termination may not necessarily lie upon the widthwise midline M of the vorticor pin 500.

Figure 16:
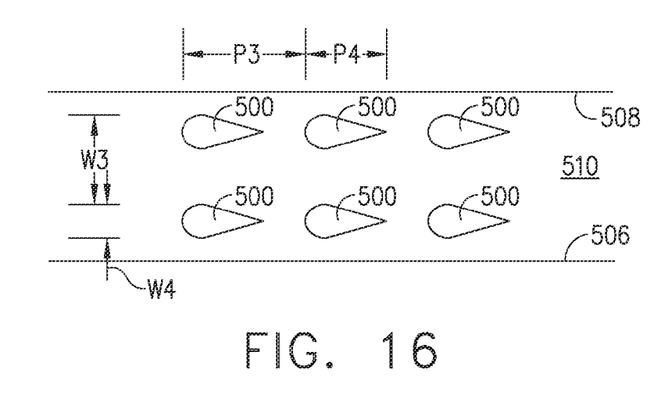
FIG. 16 is a top view a series of the exemplary embodiments of FIG. 11 distributed within a cooling channel.

As shown in FIG. 16, the exemplary vorticor pins 500 may be arranged in rows (two rows shown, in lateral and longitudinal alignment) and there may be a correlation between the spacing of the pins 500 and the dimensions of the pins themselves. In exemplary form, the longitudinal length between repeating pins 500 within a row is represented by P3, whereas the longitudinal length of each pin 500 within that same row is represented by P4. By way of guidance, design parameters may be established for longitudinal spacing of the pins 500 within a row, where the ratio of P3 to P4 (P3/P4) is between 2.0 and 10.0. In further exemplary form, the lateral width between repeating pins 500 across adjacent rows is represented by W3, whereas the lateral width of each pin 500 within a row is represented by W4. By way of guidance, design parameters may be established for lateral spacing of the pins 500, where the ratio of W3 to W4 (W3/W4) is between 3.0 to 6.0. These parameters are exemplary in nature and may be departed from based upon various considerations known to those skilled in the art.

In circumstances where particulates are deposited and the surface of the component is intended for convective heat transfer, as introduced previously, these particulates act as insulators and reduce thermal transfer between the flowing fluid and the intended heat transfer surface. These particulates tend to become trapped in flow recirculation and separation regions leading to a higher probability of accumulation and the formation of a thermal resistance. By using one or more vorticor pins 500, reduction of the stagnation and recirculation flow regions in comparison to the conventional cooling enhancement methods can be achieved.

Figure 17:
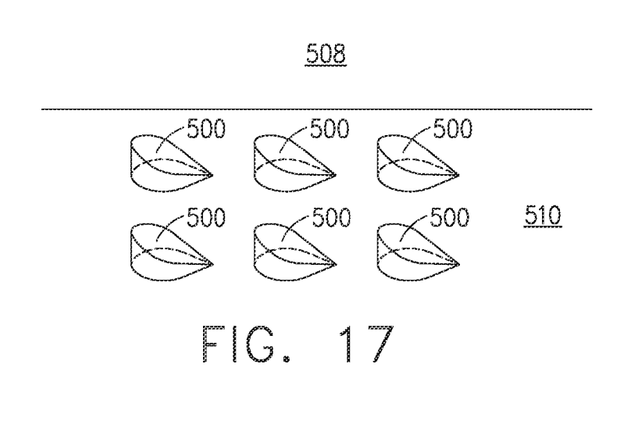
FIG. 17 is an elevated perspective view from the front left of the series of the exemplary embodiments shown in FIG. 16.
Figure 18:
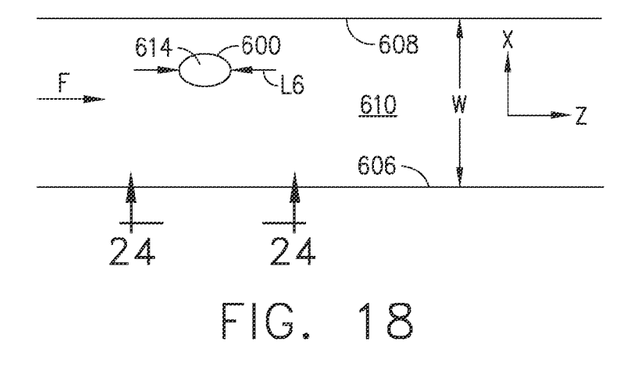
FIG. 18 is a top view of a third exemplary embodiments of a vorticor pin.
Figure 19:
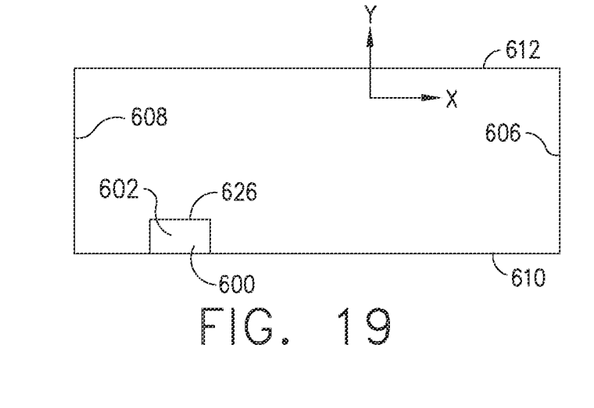
FIG. 19 is a front view of the third exemplary embodiment of FIG. 18.

For example, as shown in FIGS. 16 and 17, the vorticor pin 500 may be repeated to further reduce stagnate airflow. In this exemplary configuration, a series of vorticor pins 500 are positioned in aligned longitudinal and lateral rows. It should be noted, however, that the vorticor pins 500 may be arranged differently than as shown in FIGS. 16 and 17. For example, the rows may be laterally offset. Moreover, the pins 500 may be arranged to create the absence of lateral and/or longitudinal rows.

As shown specifically in FIGS. 18-21, a third exemplary vorticor pin 600 includes an arcuate surface 602 and a rear surface 614, both extending above a floor 610. For purposes of explanation only, the same coordinate system will be utilized as was described previously for the first exemplary vorticor pin 400. In these exemplary embodiments, the vorticor pin 600 comprises an elongated cylindrical shape (i.e., the arcuate surfaces 602) having an end surface (i.e., the rear surface 614) comprising an oblique plane.

In exemplary form with respect to the third exemplary vorticor pin 600, the pin includes an arcuate surface 602, at least a portion of which faces and is transverse to the direction of airflow F (and the Z-axis). This arcuate surface 602 may be angled between zero and forty-five degrees with respect to the Y-axis. By way of example, the accompanying drawings depict the arcuate surface 602 as being angled zero degrees with respect to the Y-axis. As will be explained in more detail hereafter, the arcuate surface 602 includes a height H (measured in the Y-direction) that varies in the widthwise direction W (parallel to the X-axis) and in the longitudinal direction (parallel to the Z-axis). And the arcuate surface 602 extends between opposing vertical, lateral walls 606, 608 that extend along the Y and Z axes, but does not completely span the lateral walls 606, 608.

By way of exemplary discussion, the lateral walls 606, 608 are bridged by the floor 610 and ceiling 612, each of which extends along the X and Z axes. In exemplary form, the floor 610 comprises a planar surface, whereas the walls 606, 608 also embody planar surfaces that each extends perpendicular to the floor. It should be noted, however, that the opposing walls 606, 608 need not be planar, nor angled perpendicularly with respect to the floor 610. Likewise, it should be understood that the floor 610 need not be planar or angled perpendicularly with respect to either or both of the lateral walls 606, 608.

The rear surface 614 of this exemplary vorticor pin 600 may completely extend from the floor 610 to a terminal edge 626 (i.e., top edge or where the rear surface and arcuate surfaces meet one another) of the arcuate surface 602 vertically spaced above the floor with the exception of where the terminal edge meets the floor 610. The rear surface 614 is inclined at an angles □3 with respect to that Z-axis that may be constant or vary across the lateral widthwise dimension W (in the X-direction). Said another way, the length of the rear surface 614 (longitudinal length between two terminal edge 626 points within a cross-section taken within a Y-Z plane) is nonuniform across the widthwise dimension W (in the X-direction).

Figure 20:
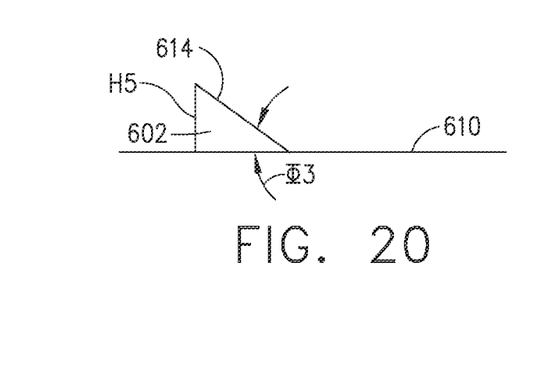
FIG. 20 is a profile view of the third exemplary embodiment of FIG. 18.
Figure 21:
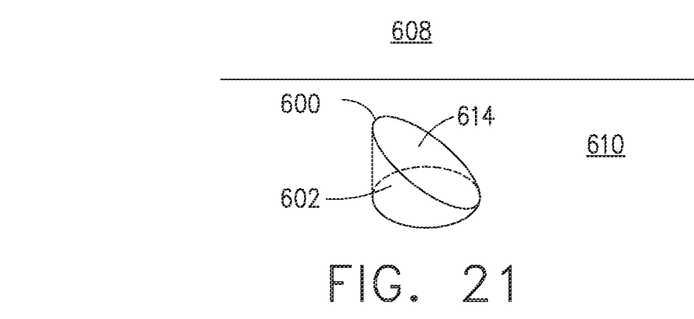
FIG. 21 is an elevated perspective view from the front left of the third exemplary embodiment of FIG. 18.

Referring specifically to FIG. 20, the angle φ3 (measured between the floor 610 and the rear surface 614) may be selected to be large enough so that the vorticor pin 600 has a reasonable overall length in the direction of cooling air flow F. As an example, the angle φ3 may be uniform across the lateral widthwise dimension W (parallel to the X-axis) or the angle φ3 may vary across the widthwise dimension W. In this exemplary embodiment, the angle φ3 is depicted in the figures as being uniform across the widthwise dimension W. In exemplary form, the angle φ3 may be about 45° or less. More specifically, the angle φ3 may be approximately less than 30°. By way of further example, for purposes of illustration in the figures only, the angle φ3 is 20 degrees.

Referring back to FIGS. 18-21, the third exemplary vorticor pin 600 includes a rear surface 614 with lengths [L] (i.e., longitudinal length between two terminal edge 626 points within a cross-section taken within an Y-Z plane) that are non-uniform. This variance in length is the product of the rear surface 614 having an oblong circular shape. In exemplary form, the minimum length of the rear surface 614 of the third exemplary vorticor pin 600 occurs at the lateral ends. By way of example, the minimum length is zero millimeters. Those skilled in the art will understand that the maximum length $L_6$ may vary depending upon various factors such as the angle □3 chosen.

In the third exemplary vorticor pin 600, the front surface 602 comprises an arcuate surface having an arcuate shape (for example, an oblong cylindrical shape) that is inhibited from being continuous by the presence of the rear surface 614, where the peripheral distance of the front surface 602 (taken with respect to cross-sections of the front surface 602 in the Y-direction) varies in the Y-direction. More specifically, the peripheral distance of the front surface 602 reaches a maximum proximate the floor 610 and reaches a minimum farthest away from the floor. Similarly, the height [H] (distance from the floor 610 to the top of the arcuate surface 602 at a given point or cross-section) of the front surface 602 also changes in the Z-direction. Consistent with the uniform angle □3, the height H (in the Y-direction) of the vorticor pin 600 changes along the length of the terminal arcuate edge 626 from a maximum height $H_5$ at the front of the pin to a minimum height [$H_6$] at the rear of the pin where the terminal arcuate edge 626 meets the floor 610. And it is also within the scope of this disclosure for the maximum height of the vorticor pin 600 to be located other than along the widthwise midline and at the front of the vorticor pin. By way of example, where the angle □3 is not uniform, the maximum height may not necessarily lie upon the widthwise midline of the vorticor pin 600.

Figure 22:
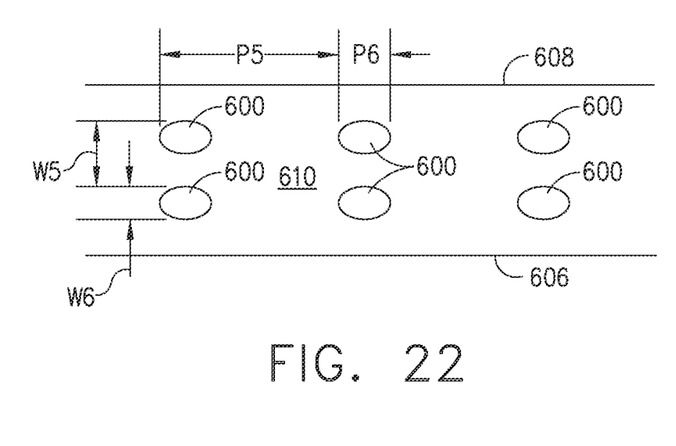
FIG. 22 is a top view a series of the third exemplary embodiments of FIG. 18 distributed within a cooling channel.

As shown in FIG. 22, the exemplary vorticor pins 600 may be arranged in rows (two rows shown, in lateral and longitudinal alignment) and there may be a correlation between the spacing of the pins 600 and the dimensions of the pins themselves. In exemplary form, the longitudinal length between repeating pins 600 within a row is represented by P5, whereas the longitudinal length of each pin 600 within that same row is represented by P6. By way of guidance, design parameters may be established for longitudinal spacing of the pins 600 within a row, where the ratio of P5 to P6 (P5/P6) is between 2.0 and 10.0. In further exemplary form, the lateral width between repeating pins 600 across adjacent rows is represented by W5, whereas the lateral width of each pin 600 within a row is represented by W6. By way of guidance, design parameters may be established for lateral spacing of the pins 600, where the ratio of W5 to W6 (W5/W6) is between 3.0 to 6.0. These parameters are exemplary in nature and may be departed from based upon various considerations known to those skilled in the art.

In circumstances where particulates are deposited and the surface of the component is intended for convective heat transfer, as introduced previously, these particulates act as insulators and reduce thermal transfer between the flowing fluid and the intended heat transfer surface. These particulates tend to become trapped in flow recirculation and separation regions leading to a higher probability of accumulation and the formation of a thermal resistance. By using one or more vorticor pins 600, reduction of the stagnation and recirculation flow regions in comparison to the conventional cooling enhancement methods can be achieved.

For example, as shown in FIG. 22, the vorticor pins 600 may be repeated to further reduce stagnant airflow. In this exemplary configuration, a series of vorticor pins 600 may be positioned in aligned longitudinal rows (three pins 600 in the first row, three pins 600 in the second row), with the rows aligned laterally. It should be noted, however, that the vorticor pins 600 may be arranged differently than as shown in FIG. 22. In such a circumstance, the vorticor pins may be arranged in rows that are not aligned laterally. Alternatively, the vorticor pins may be arranged to create the absence of lateral and/or longitudinal rows.

As described herein, the exemplary vorticor pins 400, 500, 600 may have various dimensions. For example, the height (in the Y-direction) of the front face 402, 502, 602 of the vorticor pins 400, 500, 600 is selected to be large enough so that each vorticor pin is effective in producing vortical flows and mixing. More specifically, the height of the front face 402, 502, 602 is significantly larger than any subsurface imperfections in the component surface (i.e., floor), but generally not so large as to form a significant flow blockage.

Moreover, the exemplary vorticor pins 400, 500, 600 may incorporate a curved rear surface 414, 514, 614 in lieu of the planar rear surface. Moreover, the lengths of a curved rear surface 414, 514, 614 (taken in the Z-direction) may vary across the lateral direction (W direction, parallel to the X-axis) when used in lieu of the planar rear surfaces described for the foregoing vorticor pins 400, 500, 600.

It should also be understood that while the some foregoing exemplary embodiments have been described as having rear surfaces meeting or elevated above the floor, it is also within the scope of the disclosure to terminate the rear surfaces below the floor. In such a circumstance, the terminal edge of the rear surfaces may exhibit a step change in height in comparison to the height of the adjacent floor.

Moreover, while the foregoing exemplary vorticor pins 400, 500, 600 have been described in exemplary form a particular orientation (commensurate with the figures) with respect to adjacent walls, it is also within the scope of the disclosure to rotate the vorticor pins 400, 500, 600 about the Y-axis to change the orientation of the vorticor pins with respect to the adjacent walls and, in particular, which surface is the leading surface in the direction of airflow F. For example, the exemplary vorticor pins 600 may be rotated any number of degrees with respect to the Y-axis. Those skilled in the art will understand the rotational changes that may be made to any of the foregoing exemplary vorticor pins 400, 500, 600 based upon the structure disclosed and the explanation that the rotational position may be varied in all 360 degrees in comparison with the depictions in the figures.

It should also be understood that while the interface between two or more surfaces (surfaces of the pins, surfaces of walls, etc.) may have been depicted in the drawings to have a sharp point or edge, in practice when fabricating components for use in jet engines within the scope of the instant disclosure, the interface between two or more surfaces need not come to a point or sharp edge. Rather, the surfaces may join one another via a radius or fillet. Consequently, those skilled in the art should understand that the depicted point or sharp edge between surfaces also encompasses and represents curved or rounded surface interfaces.

It should be further understood that while the foregoing exemplary vorticor pins 400, 500, 600 have been described in exemplary form as being within a confined channel (opposing lateral walls bridged by a floor and ceiling), it is also within the scope of the disclosure to utilize the vorticor pins 400, 500, 600 to arise from any surface, whether or not adjacent lateral walls or an adjacent lateral wall exists, and regardless of the presence of an opposing surface corresponding to the surface from which the vorticor pins extend (e.g., a floor vs. ceiling, one wall vs. opposing wall, etc.).

The vorticor pins described herein are useable in any structure where heat transfer is intended such as, without limitation, any structure where prior art cooling channels were provided. Nonlimiting examples of such structures include gas turbine engine combustor liners, stationary (i.e. frame) structures, turbine shrouds and hangers, turbine disks and seals, and the interiors of stationary or rotating engine airfoils such as nozzles and blades. The components described above should be considered as merely exemplary of a heat transfer structure and may be incorporated into the casting of a component, may be machined into an existing subsurface, or may be provided as separate structures that are then attached to a surface.

Following from the foregoing description, which is provided for the purpose of illustration only and not for the purpose of limitation, it should be apparent to those of ordinary skill in the art that, while the methods and apparatuses herein described constitute exemplary embodiments of the present disclosure, the disclosure is not necessarily limited to the precise embodiments and changes may be made to such embodiments without departing from the scope of the disclosure. Additionally, it is to be understood that it is not intended that any limitations or elements describing the exemplary embodiments set forth herein are to be incorporated into the interpretation of what constitutes the disclosure unless such feature or element is explicitly stated as necessary to comprise the disclosure. Likewise, it is to be understood that it is not necessary to meet any or all of the identified advantages or objects of the foregoing exemplary embodiments in order to fall within the scope of the disclosure since inherent and/or unforeseen advantages of the present disclosure may exist even though they may not have been explicitly discussed herein.

What is claimed is:

1. A structure for disrupting a flow of a fluid, the structure comprising:
   a first lateral wall and a second lateral wall spaced apart from one another, yet joined, by a floor and a ceiling; and,
   a vorticor pin extending incompletely between the first lateral wall and the second lateral wall in a direction parallel to an X-axis, the vorticor pin concurrently rising above and extending away from the floor to a height, in a direction parallel to a Y-axis, to provide a gap between the vorticor pin and the ceiling, the vorticor pin comprising:
   a front surface extending incompletely between the first lateral wall and the second lateral wall, the front surface extending above the floor and having an arcuate portion that is transverse with respect to a Z-axis, which is perpendicular to the X-axis and the Y-axis, and having a vertex that extends perpendicular from the floor and parallel to the Y-axis,
   a rear surface extending incompletely between the first lateral wall and the second lateral wall, the rear surface extending between the vertex of the front surface and the floor and meeting the floor at a linear line of termination parallel to the X-axis, the rear surface having an inclining section that tapers in height, taken parallel to the Y-axis, in a direction parallel to the Z-axis, and
   opposing side surfaces continuous with the front surface and spaced apart from one another and are non-parallel to one another relative to the Z-axis along their full extent, wherein the front surface extends forwardly from the opposing side surfaces along the Z-axis forming the arcuate portion of the front surface, wherein the opposing side surfaces extend perpendicular to the floor and parallel to the Y-axis.

2. The structure of claim 1, wherein the opposing side surfaces are parallel to one another and extend between the front surface and the rear surface.

3. The structure of claim 1, wherein the opposing side surfaces are tapered and extend between the front surface and the rear surface, and perpendicular to the floor.

4. The structure of claim 1, wherein the opposing side surfaces are angled less than twenty degrees with respect to one another.

5. The structure of claim 1, wherein the opposing side surfaces having tapered side surfaces extending in the X-Z plane.

6. The structure of claim 1, wherein the arcuate portion has a circular curvature.

7. The structure of claim 1, wherein the front surface has a uniform profile extending in the direction parallel to the Y-axis.

8. The structure of claim 1, wherein the arcuate portion has a spherical curvature.

9. The structure of claim 1, wherein the vorticor pin has a lateral width parallel to the X-axis that is less than a longitudinal length parallel to the Z-axis.

10. A structure for disrupting a flow of a fluid, the structure comprising:
    a first lateral wall and a second lateral wall spaced apart from one another, yet joined, by a floor and a ceiling; and,
    a vorticor pin extending incompletely between the first lateral wall and the second lateral wall in a direction parallel to an X-axis, the vorticor pin concurrently rising above and extending away from the floor toward a top, being spaced from the top, less than a maximum height of either the first lateral wall or the second lateral wall, the vorticor pin comprising:
    a front surface including a forward-most extent relative to the flow of fluid along the structure, and extending incompletely between the first lateral wall and the second lateral wall, the front surface extending above the floor perpendicular to the floor and parallel to a Y-axis, where the X-axis is perpendicular to the Y-axis, and where an arcuate portion of the front surface extends in a X-Z plane to define arcuate side surfaces forming a portion of the front surface extending aft of the forward-most extent with the arcuate side surfaces non-parallel to one another along their full extent along a Z-axis defined perpendicular to the Y-axis and the X-axis, and
    a rear surface extending incompletely between the first lateral wall and the second lateral wall, the rear surface extending between the front surface and the floor, the rear surface having an inclining section that is angled between zero and forty-five degrees with respect to a Z-axis being perpendicular to the Y-axis and perpendicular to the X-axis, a first portion of the inclining section is spaced apart from the floor a first distance parallel to the Y-axis, a second portion of the inclining section being spaced apart from the floor a second distance parallel to the Y-axis;
    wherein the vorticor pin has a lateral width extending along the X-axis that is less than a longitudinal length parallel to the Z-axis; and
    wherein the front surface and the rear surface terminate at a single point at the floor.

11. The structure of claim 10, wherein the arcuate side surfaces are tapered and extend between the front surface and the rear surface.

12. The structure of claim 11, wherein the vorticor pin defines a teardrop shape in the X-Z plane.

13. The structure of claim 10, wherein the front surface circumscribes the rear surface.

* * * * *